United States Patent [19]

Nedyalkov et al.

[11] 4,162,409
[45] Jul. 24, 1979

[54] DEVICE FOR CONVERTING THE ENERGY OF SEA WATER

[75] Inventors: Ivan P. Nedyalkov, Sofia; Kancho T. Kanchev, Gabrovo; Svetoslav R. Trenkov, Sofia, all of Bulgaria

[73] Assignee: CUV "Progress", Sofia, Bulgaria

[21] Appl. No.: 804,790

[22] Filed: Jun. 8, 1977

[30] Foreign Application Priority Data

Jun. 8, 1976 [BG] Bulgaria ................................. 33402

[51] Int. Cl.² ............................................. F03B 13/10
[52] U.S. Cl. ..................................... 290/53; 417/330; 60/398; 60/413
[58] Field of Search ............... 417/330, 331, 333, 326, 417/329; 290/42, 53; 60/398

[56] References Cited

U.S. PATENT DOCUMENTS

2,105,624  1/1938  Orlove ................................... 60/398
2,820,148  1/1958  Southwick ............................. 290/53

FOREIGN PATENT DOCUMENTS

280275  3/1949  Switzerland ............................. 417/330
677186  8/1952  United Kingdom ....................... 290/53

Primary Examiner—J. V. Truhe
Assistant Examiner—John W. Redman

[57] ABSTRACT

A device for converting the energy of sea waves into electrical energy. A tank-like inlet converter receives sea water from the peaks of waves and discharges it to a water-driven turbine. The turbine drives an electrical generator. Spent water from the turbine is delivered to an outlet converter which delivers the spent sea water to the troughs of the waves. The inlet and outlet converters are provided with controllable water inlet and outlet valves, respectively, which control the flow of sea water into and out of the inlet and outlet converters, respectively.

8 Claims, 3 Drawing Figures

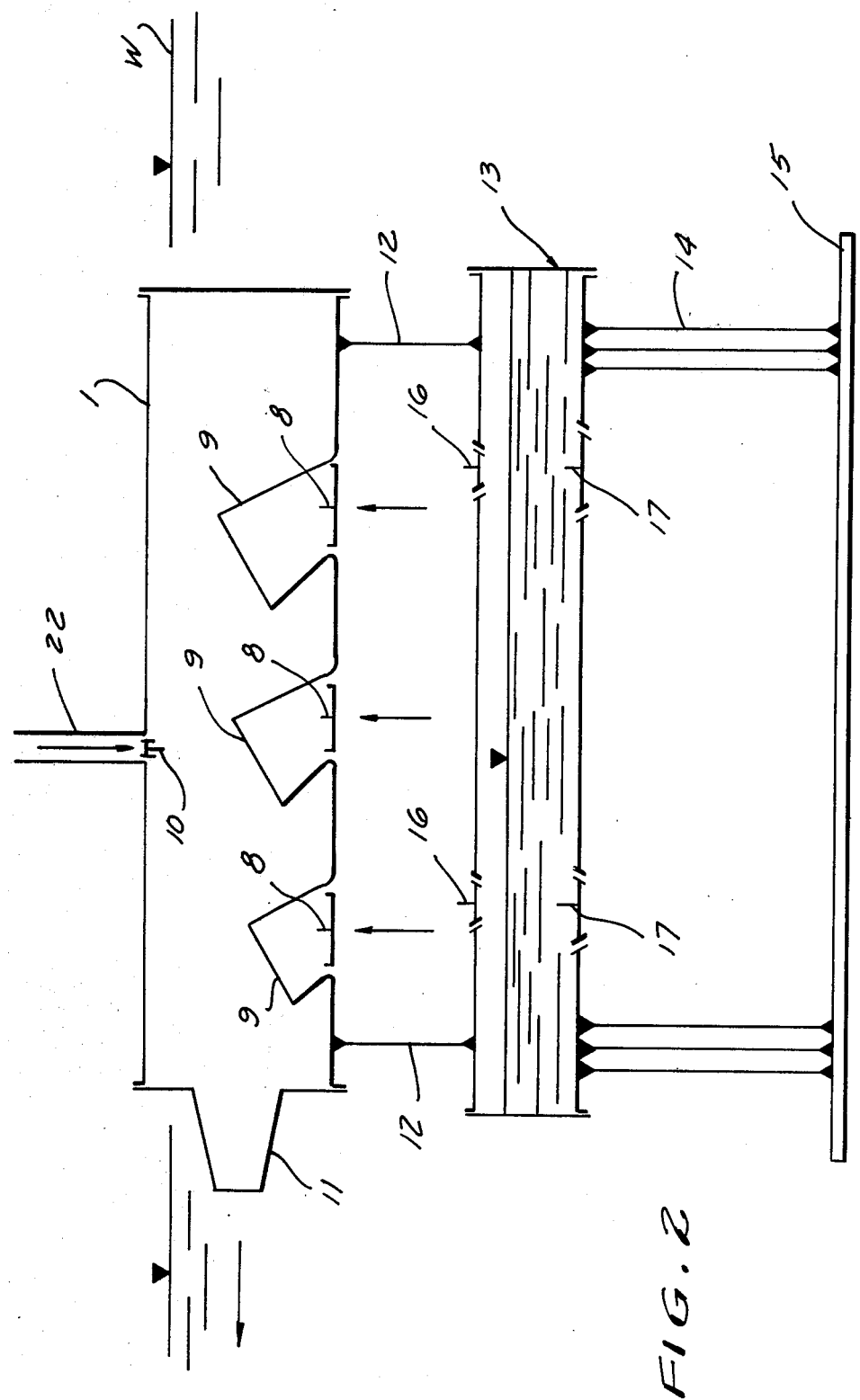

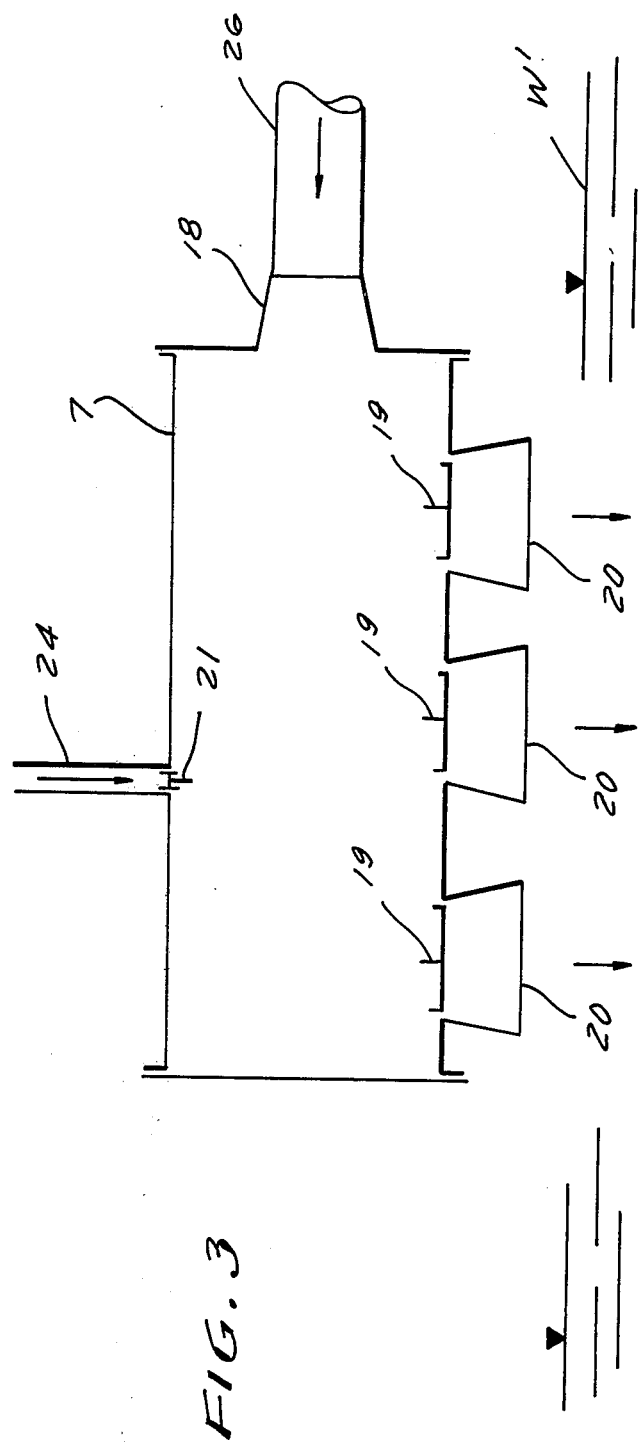

DEVICE FOR CONVERTING THE ENERGY OF SEA WATER

This invention relates to a device for converting the energy of sea waves to electrical energy.

Devices for converting the energy of sea waves are known. Among such devices is one which includes an elongated U-shaped pipe provided with floats pivotally mounted to a transverse axle, the floats performing oscillating motion as a result of the action of the waves. The oscillating motion of the floats is used for driving pumps which deliver water under pressure into a reservoir on the coast. The reservoir is hermetically sealed, thus making it possible to produce a hydrostatic pressure. The fluid is delivered from the reservoir through a regulator to a hydraulic motor or turbine. The spent water is delivered to a receiving reservoir located under the motor or turbine, and then the accumulated water is returned from the lower branch of the U-shaped pipe and the cycle is repeated.

The above known device has a number of disadvantages. Since the system is directly connected to a coastal installation, it cannot be used in a number of different regions having varying weather and wave conditions. The design of the floats is complex, and they are therefore unreliable. It is necessary to provide a secure hermetic sealing of the reservoir, since fresh water circulates in the system. The greatly elongated U-shaped pipe, to which the floats are fastened, is vulnerable to damage by strong wave motion, thereby causing the whole system to fail. The high cost of building and maintaining such installations limits their use.

Other devices for converting the energy of sea waves are known which employ a plurality of floating elements forming pairs of opposite surfaces. Such pairs of opposite surfaces are connected by means of rotating means which allow oscillating motions of the opposite surfaces to take place in two directions. By means of a plurality of bellows, fastened between the aforementioned opposite surfaces, there are provided internal spaces in which fresh water circulates. The system is provided with stabilizers which maintain it in a predetermined position with respect to the surface of the sea. Because of the stabilizers, the floating elements do not follow the motion of the surface of the sea; this results in a pumping action of the bellows, which can be used for the production of useful energy by a device driven by the water pumped by the bellows.

The known devices described immediately above have a number of disadvantages. The whole system must necessarily be hermetically sealed, since the operation of the whole system depends upon it. Even a small leak in the system may seriously hamper its operation or make it inoperative. The bellows operate under different conditions, since they are exposed to the corrosive action of sea water and high mechanical loading acting on the whole system during periods of violent wave motion. Thus, such systems lack any high degree of reliability.

Other devices for the direct conversion of the oscillating motion of water surfaces to electrical energy are known. In these devices the rising and falling of the surface of the sea causes the oscillation of a metal rod in a magnetic field produced by magnetic wings, thereby generating an electromotive force. Taking into consideration the variation in the frequency and amplitude of the oscillating motion of the surface of the sea, it is obvious that the use of the electromotive force thus produced is very difficult and inconvenient as a practical matter.

The present invention has among its objects the provision of a device for converting the energy of sea waves into electrical energy which overcomes the disadvantages of the above-described prior known devices for such purpose. The device of the invention converts the energy of the sea waves directly by means of a turbine without the use of an intermediate medium. The device provides for varying its operating conditions as required by different locations of its installation, and is mobile, so that it may be moved, if necessary to different regions of the ocean.

The above objects are accomplished in accordance with the invention in the following manner:

A supercavitating turbine is connected to an electric generator, which is connected to a control means and thence to a current delivery system. The inlet of the supercavitating turbine is connected to an inlet converter, while its outlet is connected to an outlet converter. A compressor of variable yield, supplied with power from the generator is directly connected to the inlet converter and through a reducing valve it is connected to the outlet converter. The inlet converter is a pipe, which is tightly closed in the one end, while its other end is provided with a nozzle. On its upper side the pipe is provided with an upper valve, and on the bottom side there are arranged several diffusers. In the inlet of the diffusers there are provided bottom valves. The diffusers are inclined towards the nozzle. The inlet converter is connected by means of a system of connections to a ballast system, to whose bottom side there is fastened by means of a multitude of supports a fixed stabilizer. The outlet converter is a pipe, which is tightly closed in its one side, while its other side is provided with an inlet diffuser. In the upper side of the pipe there is provided a valve. In the bottom side of the pipe there are fastened several diffusers, in the inlets of which there are provided outlet valves. The axes of the outlet diffusers are perpendicular to the axis of the inlet diffuser.

The converters are disposed parallel to the wave front and are spaced from each other at such distance that when the inlet converter is at the crest of a wave the outlet converter is in the trough of the wave.

The advantages of the present invention are:

The energy of the sea waves is used directly, without the use of an intermediate medium. The device provides the possibility of regulating its position in depth with respect to the surface of the sea. The device is mobile and can therefore be displaced in different regions of the ocean. The arrangement of the device allows for parallel connection of several inlet and outlet converters.

For a better understanding of the invention, reference should be made to the accompanying drawings in which there is illustrated and described a preferred embodiment of the invention. In the drawings:

FIG. 2 is a view of an inlet converter, certain of the parts being shown in section; and FIG. 3 is a schematic view of an outlet converter, certain of the parts being shown in section.

Figure 1:
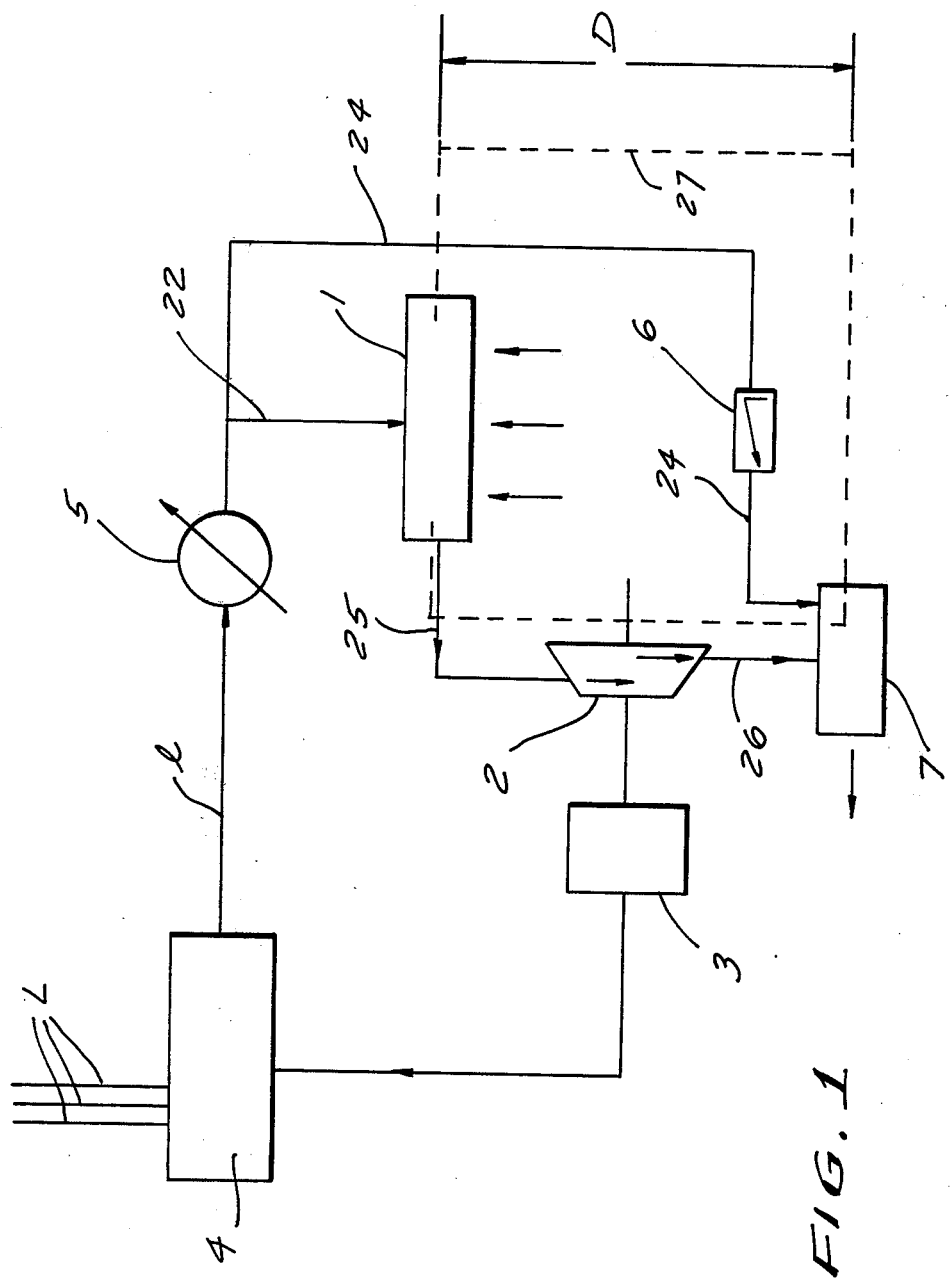
FIG. 1 is a diagrammatic illustration of a device in accordance with the invention for converting the energy of sea waves.

Turning first to FIG. 1, which schematically illustrates the entire system, an inlet converter 1 and an outlet converter 7 are shown rigidly connected together in parallel relationship by a frame work schematically indicated at 27, the converters being spaced from each other by a distance D. As above indicated, the converters 1 and 7 are oriented parallel to the wave front, the distance D being that between the crest and the trough of the waves. The inlet converter 1, which is shown more specifically in FIG. 2 and will be more fully described below, receives sea water through its underside, as indicated by the vertical arrows in FIG. 1, and discharges it through a conduit 25 which leads to the inlet of a supercavitating turbine 2. The outlet of a turbine is connected through a conduit 26 to the inlet of the outlet converter 7 which is more fully shown in FIG. 3. Turbine 2 drives an electrical generator 3, the outlet of which is fed to electrical consuming means for which a control panel 4 is provided to which electric current distributing conduits L are connected. A variable yield air compressor 5 is driven by a motor (not shown) powered by an electrical line 1 which connects the motor to the control panel 4. The air compressor 5 has its outlet connected to the inlet converter 1 by a pipe 22, in a manner to be described and to the outlet converter 7 through a pipe 24 in which there is interposed a variable pressure-reducing valve 6.

As shown in FIG. 2, the inlet converter 1 is in the form of a pipe which is tightly closed at its right-hand end and is divided at its left-hand end with a delivery nozzle 11. Air delivery pipe 22 from the air compressor 5 is connected to the upper side of the inlet converter 1, the delivery of air from conduit 22 into the inlet converter being controlled by an upper valve 10. On its bottom side the inlet converter 1 is provided with a plurality of diffusers 9 which are inclined with respect to the longitudinal axis of the converter 1 and the nozzle 11. Each diffuser 9 is provided with an inlet valve 8 at its bottom. As shown in FIG. 2, when a wave reaches the height W, water enters the inlet converter 1 through the now open valves 8 and the diffusers 9. The inlet converter 1 is maintained at the desired depth in the sea by a ballast system including a tank 13 having one or more water valves 17 on its bottom and one or more air valves 16 on its top. The inlet converter 1 is connected to the tank 13 through rigid connecting means 12. Tank 13, in turn, is connected to a stabilizing anchor means 15 by rigid support members 14. The connections 12 and 14 are such as to prevent the inlet converter 1 in the ballast system including tank 13 against vertical motion in response to the wave motion of the sea.

As shown in FIG. 3, the outlet converter 7 is in the form of an elongated pipe which is closed at its left-hand end, the other end of the converter being provided with an inlet diffuser 18 to which the conduit 26 leading from the outlet of the turbine 2 is connected. The pipe 24 leading from the variable air pressure reducing valve 6 is connected to the top of the outlet converter 7, the air flowing through pipe 24 into the outlet converter being controlled by an air valve 21. On its bottom side, the outlet converter 7 is provided with a plurality of outlet diffusers 20 which are directed outwardly and downwardly, the axes of diffusers 20 being perpendicular to the longitudinal axis of the outlet converter 7 and the inlet diffuser 18. Each of outlet diffuser 20 is provided with an outlet valve 19, as shown. It will be apparent that the outlet converter 7 receives the spent sea water from the turbine 2 and releases it into the sea through the open outlet valves 19 and the outlet diffusers 20. When the lower ends of diffusers 20 are above the troughs W' of the waves. The water inlet valves 8 the bottom of the inlet converter 1 and the water outlet valves 19 at the bottom of the outlet converter 7 are controlled by the air pressure within the inlet and outlet converters, such pressure being created by the air compressor 5. Compressor 5 produces a predetermined air pressure $P_{CT}$ for controlling the time of opening of the valves 8 and 19. Obviously, other means may be employed for controlling valves 8 and 19; in this case the compressor 5 is replaced by other known valve regulating means suitably connected to the water inlet valves 8 and the water outlet valves 19.

Although the invention is illustrated and described with reference to one preferred embodiment thereof, it is to be expressly understood that it is in no way limited to the disclosure of such a preferred embodiment, but is capable of numerous modifications within the scope of the appended claims.

What is claimed is:

1. A device for converting the energy of sea waves into electrical energy, comprising a tank-like inlet converter for receiving sea water from the peaks of waves, a water-driven turbine connected to the inlet converter to be driven by the water discharged from the inlet converter, a tank-like outlet converter receiving spent water from the turbine and discharging it to the troughs of waves, an electrical generator driven by the turbine, at least one controllable outlet valve on the outlet converter, and a compressor for delivering air under variable, controlled pressure to said converters, the inlet and outlet valves being controlled by the pressure of air within the inlet and outlet converters, respectively.

2. A device according to claim 1, comprising means rigidly connecting the inlet and outlet converters together.

3. A device according to claim 1, comprising an electric motor for driving the compressor, and circuit means to supply the motor with electric current generated by said generator.

4. A device according to claim 1, wherein the turbine is a supercavitating turbine.

5. A device according to claim 2, comprising a ballast system including flotation means connected to the inlet converter, and means for anchoring the flotation means and the inlet converter to the sea bottom.

6. A device according to claim 5, wherein the flotation system includes a tank, and comprising at least one air valve on the top of the tank and at least one water valve on the bottom of the tank.

7. A device for converting the energy of sea waves into electrical energy, comprising a tank-like inlet converter for receiving sea water from the peaks of waves, a water-driven turbine connected to the inlet converter to be driven by the water discharged from the inlet converter, a tank-like outlet converter receiving spent water from the turbine and discharging it to the troughs of waves, an electrical generator driven by the turbine, at least one controllable inlet valve on the inlet converter, at least one controllable outlet valve on the outlet converter, the inlet converter being a pipe one end of which is tightly closed, while its other end is provided with a nozzle; the pipe being provided on its upper side with an upper valve, while in the bottom side of the pipe, inclined towards the nozzle, there is fastened at least one diffuser, in the inlet of which there is provided a bottom valve, and by means of at least two cojnections, the inlet converter is connected to a ballast system, to the bottom end of which there is fastened rigidly by means of a multitude of supports a stabilizer.

8. A device for converting the energy of sea waves into electrical energy, comprising a tank-like inlet converter for receiving sea water from the peaks of waves, a water-driven turbine connected to the inlet converter to be driven by the water discharged from the inlet converter, a tank-like outlet converter receiving spent water from the turbine and discharging it to the troughs of waves, an electrical generator driven by the turbine, at least one controllable inlet valve on the inlet converter, at least one controllable outlet valve on the outlet converter, the outlet converter being a pipe, one end of which is tightly closed, while its other end is provided with an inlet diffuser, and in the upper part of the pipe there is fastened a valve, while in the bottom part of the pipe there is provided a release valve, and the axis of the diffuser is perpendicular to the axis of the inlet diffuser.

* * * * *